May 3, 1966 K. RUNGALDIER ET AL 3,249,515
METHOD OF DESTROYING FOAM IN FERMENTERS
Filed June 14, 1961 3 Sheets-Sheet 1

Inventors
Karl Rungaldier
Ernst Braun

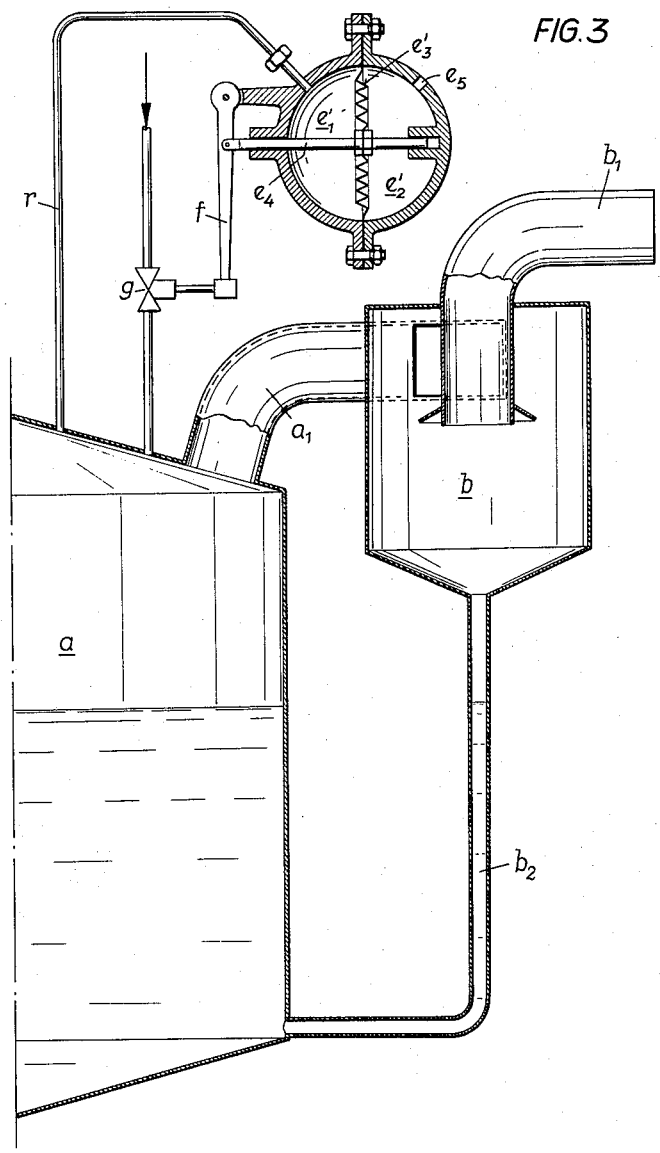

United States Patent Office 3,249,515
Patented May 3, 1966

3,249,515
METHOD OF DESTROYING FOAM IN FERMENTERS
Karl Rungaldier, Kaernten, and Ernst Braun, Vienna, Austria, assignors to Patentauswertung Vogelbusch Gesellschaft m.b.H., Vienna, Austria, a company of Austria
Filed June 14, 1961, Ser. No. 117,028
Claims priority, application Austria, June 20, 1960, 4,690/60
4 Claims. (Cl. 195—107)

The invention relates to a method of destroying foam in fermenters, more particularly yeast propagators, by controlled addition of an anti-foaming agent.

In aerobic yeast cultures large quantities of foam are often produced spontaneously, and if the foam is to be destroyed while it is forming, so that the vat does not overflow, the events in the vat must be controlled by addition of anti-foaming agents. Yet even with great attention and care, the amounts of anti-foaming agent added cannot be controlled by known foam-reducing methods so as to correspond exactly to the amount of foam being evolved. To safely avoid overflowing of the vat, the amount of anti-foaming agent added according to the known methods is much greater than that sufficient for destroying the foam. The excess amount of anti-foaming agent is expensive. It also impairs conversion, makes subsequent separation and filtration difficult and impairs the taste of the yeast.

The invention provides addition of anti-foaming agent in an amount which is neither in excess of nor less than the required amount.

According to the invention, the quantity of anti-foaming agent to be added to a fermentation vat is controlled by signals generated responsive to the rate at which mash is separated from the foam and returned to the vat by a mash separator disposed in the waste gas pipe of the vat.

The amount of anti-foaming agent added is therefore proportional to the amount of foam formed. Not all foam is being destroyed, but the evolution of foam is kept at a predetermined rate sufficiently low to prevent overflowing of the vat. The difference between the level of the liquid in the return pipe of the separator and the level of liquid in the vat may be used to measure the rate of mash returning to the vat from the mash separator. The corresponding difference in hydrostatic pressure generates a signal for controlling the supply of anti-foaming agent.

Alternatively, the supply of anti-foaming agent may be controlled by signals derived from the pressure of the mixture of waste gas and foam ahead of a separator. This pressure is proportional to the rate of mash separation from the foam in the separator.

To separate the mash particles from the mixture of gas and foam, the mixture is led into a rotary path in a separator. The relatively heavy mash particles are deposited by centrifugal force on the separator wall whence they return through a mash return pipe into the yeast propagation vat, whereas the waste gases free from liquid leave the separator through a central pipe and the remainder of the waste gas pipe. The energy required for the separation of the liquid and gaseous particles is derived from the pressure ahead of the separator.

We have found that the pressure required to accelerate the mixture of waste gas and foam for centrifugal separation is uniquely related to the quantity of mash present in the mixture. The rate of mash separation is directly proportional to the pressure. The velocity distribution in the centrifugal separator is substantially independent of the amount of foam—and therefore of mash—in the mixture of waste gas and foam entering the separator. The foam does not appreciably affect rotary flow velocity. Consequently, the energy required in excess of the energy consumed for accelerating a foam-free waste gas is used for acceleration and separation of the mash. The extra energy required is therefore proportional to the mass of the foam which is practically identical with that of the mash contained therein so that the pressure ahead of the separator is proportional to the rate of mash separation. Under the normal assumption that the quantity of waste gas is constant, pressure variation is only a function of the simultaneous variation in the rate of mash separation.

The invention will be described hereinafter in greater detail with reference to the drawings which illustrate three embodiments of apparatus for performing the method according to the invention, and in which:

FIG. 1 diagrammatically illustrates a first such apparatus;

FIG. 3 illustrates another apparatus for carrying out the method of the invention.

Figure 1:
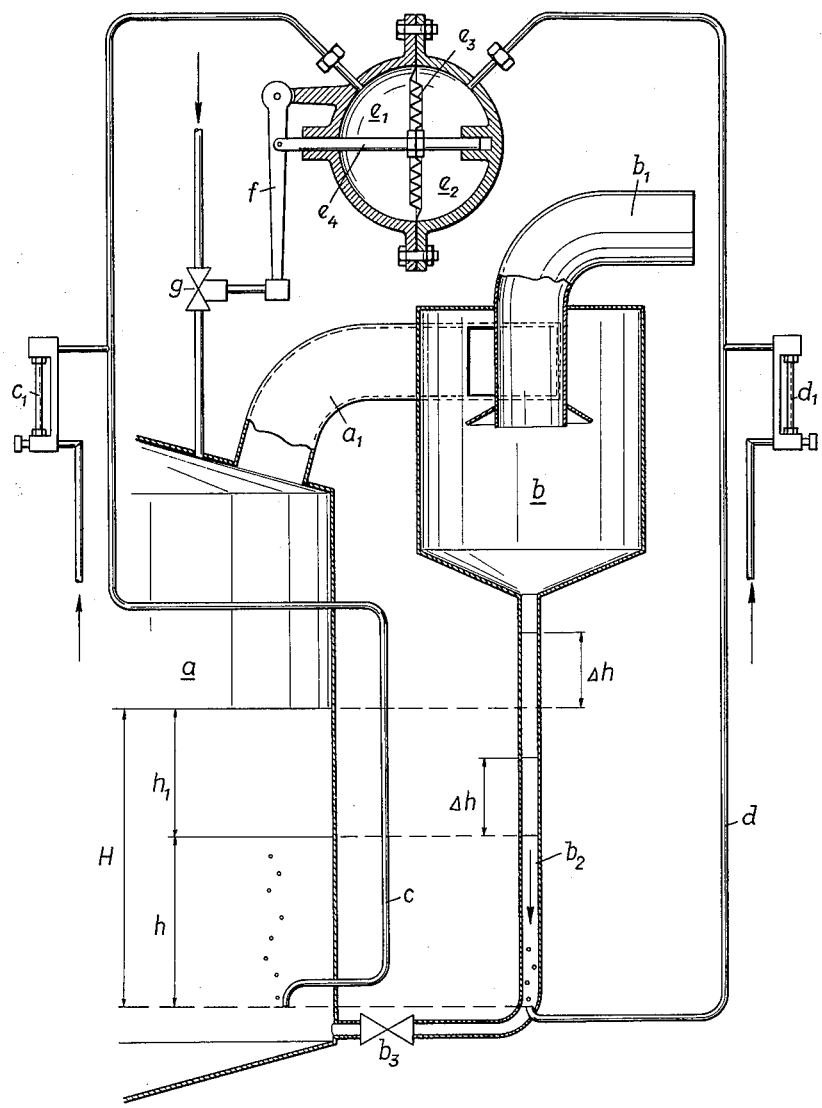

Referring to FIG. 1, a fermenter or yeast propagator $a$ is equipped with a known aerating system (not shown) for aerating the mash. Disposed between two portions of a waste gas pipe $a_1$, $b_1$ is a mash separator $b$ which is connected to the bottom of the vat $a$ through a mash return pipe $b_2$. A compressed air line $c$ extends into the vat $a$, and a compressed air line $d$ has an orifice in the mash return pipe $b_2$ at the same level as the orifice of the pipe $c$ in the vat $a$. The other ends of the pipes $c$, $d$ are connected to separate chambers $e_1$, $e_2$ of a control actuator operated by differential pressure. The chambers $e_1$, $e_2$ of the actuator are separated from one another by a movable wall constituted by a diaphragm $e_3$ which actuates a needle valve $g$ by means of a control rod $e_4$ and a lever $f$. The needle valve is arranged in a conduit through which anti-foaming agent is admitted to the vat $a$. The orifice of the air tube $d$ in the mash return pipe $b_2$ faces against the direction of mash flow. The air supplied to each pipe $c$, $d$ from a compressed air source is measured by a miniature flow meter (small rotameter) $c_1$, $d_1$ respectively. A throttle valve $b_3$ is provided in the mash return pipe $b_2$ between the mash separator $b$ and the vat $a$.

The foam evolved during fermentation or yeast propagation in the vat $a$ passes through the waste gas pipe $a_1$ to the mash separator $b$ where the mash entrained with the foam is removed. The waste gases free from liquid leave the mash separator $b$ through the waste gas pipe $b_1$, whereas substantially gas-free mash is returned to the vat $a$ through the return pipe $b_2$. By means of the throttle $b_3$ the liquid level in the return pipe $b_2$ may be set higher by a difference $\Delta h$ than the effective liquid level $h$ in the vat, and the basic rate of mash return is adjusted by the throttle $b_3$. The throttle valve $b_3$ can be omitted if the flow section of the mash return pipe $b_2$ is such that the level difference $\Delta h$ has a mean value which is suitable for control purposes as will become apparent hereinafter.

The effective liquid level $h$ in the vat $a$ is measured in terms of hydrostatic pressure, since the actual level of the mash in the vat is obscured by gas bubbles and foam. The hydrostatic pressure is measured by means of the compressed air pipe $c$ which is supplied with compressed air through the associated flow meter $c_1$ at such a rate as to bubble air from an orifice of the pipe $c$ into the liquid in the vat. The pressure of the air in the tube $c$ then corresponds to the hydrostatic pressure at the orifice. This hydrostatic pressure is independent of the extent to which the liquid in the vat has been aerated or converted into foam and is always equal to the height $h$ of the unaerated and unfoamed liquid multiplied by its density. The hydrostatic pressure in the return pipe $b_2$ is measured by means of the compressed air pipe $d$ which is supplied through its associated flow under $d_1$ with compressed air at such a rate that the air bubbles from an orifice of the tube $d$ into the pipe $b_2$. The pressure of the air in the tube $d$ then is equal to the height $h+\Delta h$ multiplied by the density of the liquid. The fact that the stream of air from the orifice of the tube $d$ in the pipe $b_2$ emerges in a direction opposite to the direction of flow of the stream of mash makes the measurement of $h+\Delta h$ independent of the velocity of liquid flow at the orifice of the pipe $d$.

The difference between the pressures in the pipe $d$ and in the pipe $c$ at a fixed setting of the valve $b_3$ is indicative of the rate of mash flow through the mash return pipe $b_2$. The diaphragm $e_3$ of the control actuator moves according to changes in this pressure difference, and such movement is transmitted by means of the linkage $e_4$, $f$ to the needle valve $g$ which controls the supply of anti-foaming agent to the vat.

Figure 2:
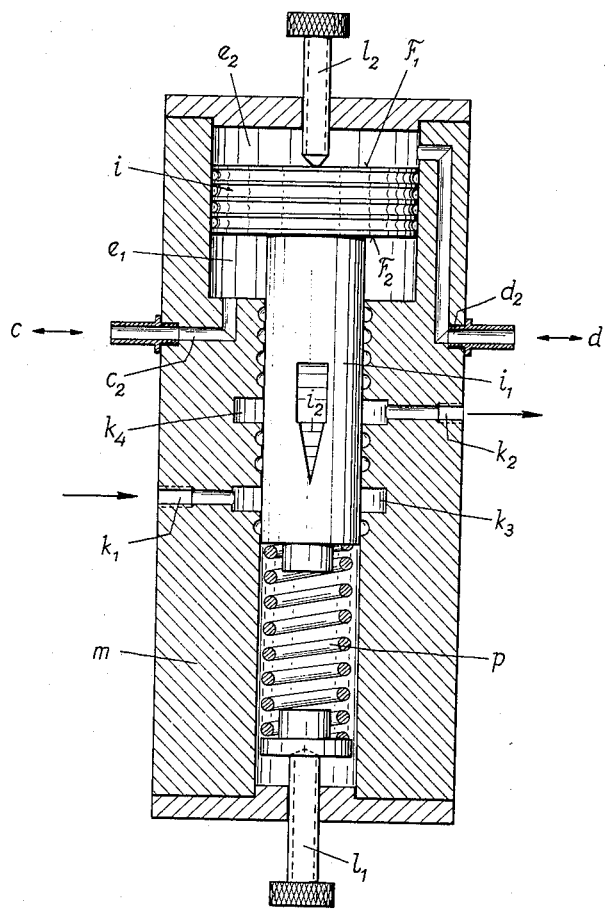
FIG. 2 is a view in axial section of a piston valve which may be employed in the devices of FIGS. 1 and 3.

Instead of a diaphragm type actuator and a needle valve $g$, the piston valve shown in FIG. 2 can be used for controlling flow of the anti-foaming agent. The chambers $e_1$, $e_2$ in the valve body $m$ on opposite sides of a piston $i$ are connected to the compressed air pipes $c$, $d$ through bores $c_2$, $d_2$ and are separated by a piston $i$. The piston is fastened to a piston rod $i_1$ formed with a transverse duct or passage $i_2$ which tapers longitudinally of the piston rod. Two portions $k_1$, $k_2$ of the supply pipe for the anti-foaming agent terminate in respective axially spaced annular chamber $k_3$, $k_4$ which extend about the piston rod $i_1$. The chambers can be connected to one another through the transverse passage $i_2$, the effective flow section of which varies with the position of the control piston $i$. In the position shown in FIG. 2, the passage $i_2$ communicates only with the portion $k_2$ of the supply pipe through the chamber $k_4$, for the passage $i_2$ is not aligned with the chamber $k_3$. When the piston $i$ and the piston rod $i_1$ descend, communication between the branches $k_1$ and $k_2$ is established by way of the gradually widening passage $i_2$, each position of the piston $i$ being associated with a definite flow section for the anti-foaming agent. The piston $i$ is urged by a spring $p$ to move so as to reduce the effective flow section of the transverse passage $i_2$. An adjusting screw $l_1$ is provided to adjust the prestressing of the spring $p$. The piston $i$ when in the end position seen in FIG. 2 interrupts communication between the two supply pipe portions $k_1$, $k_2$; this end position can be adjusted by means of an adjustable stop $l_2$.

The pressure produced in the compressed air tube $d$ acts upon the top face $F_1$ of the piston $i$, while the smaller air pressure in the tube $c$ acts on the smaller underside $F_2$ of the piston $i$. The differential pressure urges the piston $i$ toward the position in which the transverse passage $i_2$ interconnects the upply pipe portions $k_1$, $k_2$. The force $P_1$ acting on the piston is derived as follows:

$$P_1 = F_1(h+\Delta h)\gamma - (F_1-F_2)h\gamma$$
$$= \gamma(F_1\Delta h + F_2 h)$$

wherein $\gamma$ is the density of the mash.

In a state of equilibrium, this force is balanced by the force of the spring $p$.

If the quantity of mash returned remains constant but the level in the vat $a$ rises from the level $h$ to the level $H = h+h_1$ (FIG. 1) during yeast propagation, the level of the liquid in the mash return pipe $b_2$ is $H+\Delta h$. The force now urging the stepped piston $i$ toward the position in which it connects the supply pipe portions is:

$$P_2 = F_1(h+h_1+\Delta h)\gamma - (F_1-F_2)(h+h_1)\gamma$$
$$= \gamma(F_1\Delta h + F_2 h + F_2 h_1) = P_1 + \gamma F_2 h_1$$

The force $P_2$ is greater by $\Delta P = \gamma F_2 h_1$ than the force $P_1$ opposing the spring $p$ when the level in the vat $a$ is $h$. Consequently, an increased amount of anti-foaming agent is added when the liquid level in the vat rises. The vat cannot overflow with foam even when the quantity of liquid in the vat increases as yeast propagation proceeds.

The prestressing P of the spring $p$ for zero return of mash from the separator ($\Delta h=0$) is derived from the equation $$P = \gamma F_2 h$$

If the liquid level has risen by an amount $\Delta h_1$ from an initial level $h$, the adjusting screw $l_1$ must stress the closing spring $p$ to a force P':

$$P' = \gamma(F_1\Delta h_1 + F_2 h)$$

The throttle $b_3$ enables the mash return rate, and therefore the difference in level associated therewith, to be varied as required without any alteration in the rate of mash return. The pressure difference used to initiate control action can therefore be increased in order to increase the accuracy of measurement. By adjusting the throttle $b_3$ and the prestressing of the spring $p$, the addition of anti-foaming agent can be adjusting exactly for any mash return rate, thus ensuring very economic use of the anti-foaming agent under all operating conditions and avoiding the disadvantages of an excessive addition of such agent.

FIG. 3 illustrates another apparatus for performing the method according to the invention. It is based on the fixed relationship between the pressure of the mixture of waste gas and foam in the apparatus and the and the rate of mash separation. A fermenter or yeast propagator $a$ is equipped with a known mash aerating system (not shown). A mash separator $b$ is interposed between two waste gas and foam in the apparatus and the rate vat $a$ through a mash return pipe $b_2$. A pipe $r$ branches from the top of the vat $a$ and terminates in a chamber $e_1'$ of a pressure responsive actuator. One wall of the chamber $e_1'$ is a diaphragm $e_3'$ which is connected to a valve $g$. The valve controls the dispensing of the anti-foaming agent. The connection is provided by a control linkage including a rod $e_4$ and a lever $f$. The second chamber $e_2'$ of the actuator is separated from the first chamber $e_1'$ by the diaphragm $e_3'$ and communicates with the atmosphere through an aperture $e_5$ in the chamber casing.

The foam evolved during fermentation or yeast propagation in the vat $a$ passes through the waste gas pipe $a_1$ to the centrifugal separator $b$ where the mash in the foam is deposited on the separator wall by centrigual force. The waste gases leave the separator $b$ through the part $b_1$ of the waste gas pipe, whereas substantially gas-free mash is returned through the return pipe $b_2$ to the vat $a$. The pressure of the mixture of gas and foam ahead of the separator is proportional to the mash separation rate in the centrifugal separator and is transmitted by the pipe $r$ to the chamber $e_1'$. The orifice of the pipe $r$ could also be in the waste gas pipe part $a_1$ ahead of the centrifugal separator $b$ without changing the mode of operation of the apparatus.

The pressure in the pipe $r$ is therefore a yardstick for the centrifugal force required to separate the mash from the foam. This force being proportional to the mass of the mash, the pressure is also a yardstick for the quantity of mash separated. The diaphragm $e_3'$ is deflected responsive to the pressure. The movement of the diaphragm $e_3'$ is transmitted through the linkage $e_4$, $f$ to the valve $g$ dispensing of the anti-foaming agent.

The rate of supply of anti-foaming agent is controlled by the rate of mash separation as in the first embodiment, but the relationship which we have discovered between the pressure of the mixture of waste gas and foam and the rate of mash separation makes it much simpler to carry the method out and also simplifies the apparatus required.

What is claimed and desired to be protected by Letters Patent of the United States is:

1. A method of controlling foaming on a top surface of a body of yeast culture medium in a container, said body being aerated, which method comprises:
   (a) leading waste gas from the surface of said body, whereby foam consisting of gas and portions of said medium is entrained with said waste gas;

(b) continuously separating the entrained medium from said waste gas and the gaseous remainder of said foam;
(c) generating a signal responsive to the rate of separation of said entrained medium;
(d) adding an anti-foaming agent to said body; and
(e) controlling the amount of the added anti-foaming agent responsive to the signal generated.

2. A method as set forth in claim 1, wherein said separated medium is returned to said body in a continuous stream, and said signal is generated responsive to the rate of flow of said stream.

3. A method as set forth in claim 1, wherein said separated medium is returned by gravity to a bottom portion of said body in a continuous stream, and said signal is generated responsive to a differential in hydrostatic pressure in predetermined portions of said body and of said stream.

4. A method of controlling foaming of a body of yeast culture medium in a substantially closed container which method comprises:
(a) aerating said body whereby a mixture of waste gas and of a foam consisting essentially of respective portions of said body and of said waste gas is formed in said container, said mixture being under pressure;
(b) discharging said mixture from said container by said pressure into an arcuate path and separating said portion of said body from the remainder of said mixture by the centrifugal forces generated by the arcuate movement of the mixture in said path;
(c) generating a signal responsive to the pressure of said mixture in said container;
(d) adding an anti-foaming agent to said body; and
(e) controlling the amount of the added anti-foaming agent responsive to the signal generated.

References Cited by the Examiner

UNITED STATES PATENTS

| | | | |
|---|---|---|---|
| 1,964,641 | 6/1934 | Mathias | 195—134 |
| 2,351,970 | 6/1944 | Jansen | 195—135 |
| 2,508,528 | 5/1950 | McPherson | 252—361 |
| 2,564,765 | 8/1951 | Mercier | 252—361 |
| 2,572,823 | 10/1951 | Wallerstein et al. | 195—29 |
| 2,759,871 | 8/1956 | Cash | 195—36 |

A. LOUIS MONACELL, *Primary Examiner.*

TOBIAS E. LEVOW, ABRAHAM H. WINKELSTEIN, *Examiners.*

M. W. GREENSTEIN, D. M. STEPHENS, *Assistant Examiners.*